United States Patent
Duong et al.

(10) Patent No.: US 12,384,954 B2
(45) Date of Patent: Aug. 12, 2025

(54) POLYMER MATRIX PARTICLES FOR INHIBITING SCALE FORMATION IN OIL AND GAS WELLS

(71) Applicant: Battelle Memorial Institute, Columbus, OH (US)

(72) Inventors: Anthony D. Duong, Columbus, OH (US); Ramanathan S. Lalgudi, Columbus, OH (US); Phillip N. Denen, Columbus, OH (US)

(73) Assignee: Battelle Memorial Institute, Columbus, OH (US)

(*) Notice: Subject to any disclaimer, the term of this patent is extended or adjusted under 35 U.S.C. 154(b) by 0 days.

(21) Appl. No.: 18/183,980

(22) Filed: Mar. 15, 2023

(65) Prior Publication Data
US 2023/0212451 A1    Jul. 6, 2023

Related U.S. Application Data

(62) Division of application No. 17/391,947, filed on Aug. 2, 2021, now Pat. No. 11,618,846, which is a division of application No. 15/686,583, filed on Aug. 25, 2017, now abandoned.

(60) Provisional application No. 62/381,839, filed on Aug. 31, 2016.

(30) Foreign Application Priority Data

Apr. 11, 2022   (JP)   ................ 2022-065332

(51) Int. Cl.
C09K 8/528   (2006.01)
E21B 37/06   (2006.01)

(52) U.S. Cl.
CPC .......... *C09K 8/528* (2013.01); *E21B 37/06* (2013.01)

(58) Field of Classification Search
CPC ................ C09K 8/52; C09K 8/528
See application file for complete search history.

(56) References Cited

U.S. PATENT DOCUMENTS

| | | | |
|---|---|---|---|
| 2,771,480 A | 11/1956 | Chasanov et al. | |
| 4,179,549 A | 12/1979 | Buriks et al. | |
| 5,728,302 A * | 3/1998 | Connor | ............. E21B 43/02 |
| | | | 210/683 |
| 6,117,364 A | 9/2000 | Vorderbruggen et al. | |
| 6,560,923 B1 | 5/2003 | Kamei et al. | |
| 8,763,700 B2 | 7/2014 | McDaniel et al. | |

(Continued)

OTHER PUBLICATIONS

Product information of Eichrom Technologies LLC retrieved May 22, 2024 from https://www.eichrom.com/products/ion-exchange-resins/ (Year: 2024).*

(Continued)

*Primary Examiner* — Aiqun Li
(74) *Attorney, Agent, or Firm* — Susanne A. Wilson; Frank Rosenberg

(57) ABSTRACT

Polymer matrix particles useful for inhibiting scale formation in oil and gas wells are described. The insoluble, porous, crosslinked polymer matrix includes a polymer backbone and ionic functional groups covalently bonded to the backbone, the ionic functional groups being capable of selectively attracting and binding salt scale-forming ions when in contact with a liquid containing such ions.

8 Claims, 1 Drawing Sheet

(56) References Cited

U.S. PATENT DOCUMENTS

| | | | |
|---|---|---|---|
| 2009/0101585 A1* | 4/2009 | Burg | B01J 49/60 |
| | | | 530/395 |
| 2013/0056204 A1* | 3/2013 | McDaniel | C09K 8/536 |
| | | | 507/252 |
| 2013/0157905 A1* | 6/2013 | Saini | C09K 8/12 |
| | | | 507/214 |

OTHER PUBLICATIONS

Alexandratos, Spiro D. "Ion-Exchange Resins: A Retrospective from Industrial and Engineering Chemistry Research", Ind. Eng. Chem. Res. 2009, vol. 48, pp. 388-398.
Amara et al., Hydrometallurgy, 65, 2002, pp. 59-68, "Modified cation exchange resin applied to demineralisation of a liquid industrial waste. Comparison to a classical treatment and electrodialysis".
Wolowicz et al. Chemical Engineering Journal, 171, (2011), 206-215, "Comparison of strongly basic anion exchange resins applicability for the removal of palladium(II) ions from acidic solutions".
Product Data Sheet of Amberlite IRC 200 Na Ion Exchange Resin by Dupont. (Year 2019).

* cited by examiner

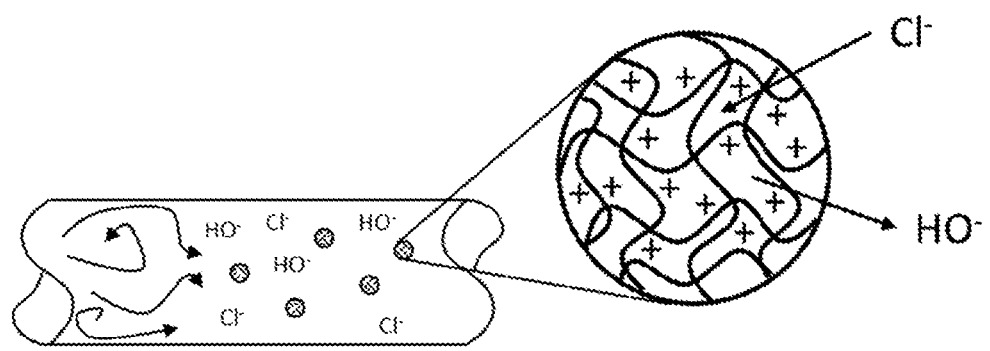

POLYMER MATRIX PARTICLES FOR INHIBITING SCALE FORMATION IN OIL AND GAS WELLS

CROSS-REFERENCE TO RELATED APPLICATIONS

This application is a divisional of U.S. patent application Ser. No. 17/391,947 filed Aug. 2, 2021, which is a divisional of U.S. patent application Ser. No. 15/686,583 filed Aug. 25, 2017 which claims the priority to U.S. Provisional Patent Application No. 62/381,839 filed Aug. 31, 2016, the entire disclosures of which are incorporated herein by reference.

BACKGROUND OF INVENTION

This invention relates in general to materials useful in oil and gas production, and in particular to improved materials for inhibiting scale formation in oil and gas wells.

Oil and gas production usually involves drilling wells to extract the oil and gas from underground formations. The extracted oil and gas often is accompanied by brine. As the brine proceeds through the well from the formation to the surface, pressure and temperature change and water evaporates, and dissolved salts can precipitate and form scale on surfaces of the well and related equipment. Scaling can also result from the practice of brine injection into a formation to maintain pressure and sweep the oil and gas to producing wells. Some common oilfield scales are halite, calcite, barite, celestite, anhydrite, gypsum and iron sulfide.

The formation of scale on surfaces of the well and related equipment is a major production problem. Scale build-up reduces well productivity and shortens the lifetime of production equipment.

A number of methods can be used for removing scale after it has formed, including milling, fluid jetting, and chemical dissolution. However, in order to clean the well and equipment it is necessary to stop the production, i.e., by killing/stopping the well, which is time-consuming and costly. Also, these methods are not always effective.

Other methods can be used for inhibiting scale formation. For example, fresh water can be pumped into the well as a diluent to reduce salt precipitation from the brine. However, the fresh water is not only a precious natural resource, but it also represents a significant process cost because typically it must either be shipped to the drilling site or produced on-site using desalination equipment.

Scaling can also be reduced by the introduction of scale inhibitors into the formation or well. Some commercially available halite inhibitors use polymeric peptide features. An example is Bellasol® H21, manufactured by BWA Water Additives, Tucker, Georgia, USA.

There is still a need for improved materials for inhibiting scale formation during oil and gas production.

Ion-exchange resins are used in different separation, purification and decontamination processes, such as water softening and water purification. For an overview see Alexandratos, Spiro D. Ion-Exchange Resins: A Retrospective from Industrial and Engineering Chemistry Research, *Ind. Eng. Chem. Res.* 2009, 48, 388-398.

The patent literature discloses preparing quaternary ammonium salts from polymerizable tertiary ammonium monomers: see U.S. Pat. No. 4,179,549 by Buriks et al., issued Dec. 18, 1979.

BRIEF DESCRIPTION OF THE DRAWING

FIG. 1 is a schematic illustration of a polymer matrix particle according to the invention removing salt scale-forming ions from brine inside a well to inhibit scaling.

DETAILED DESCRIPTION OF THE PREFERRED EMBODIMENT

The present invention relates to polymer matrix particles for inhibiting scale formation in oil and gas wells. The technology provides a number of advantages in effectiveness and cost savings, and addresses the problem of water usage in oil and gas production. Moreover, the inhibition mechanism of the matrix particles will work in a large range of pH values commonly encountered in drilling operations.

Although there are scale inhibitors currently in use in the oil and gas industry, the present invention offers a new mechanism to inhibit scale formation. Current scale inhibitors such as hydroxyethylenediphosphonic acid (HEDP) and diethylenetriaminepenta (methylenephosphonic) acid (DTPMP) work by using chelation to attract positively charged metal ions present in brine. After the metal ions are chelated, their salts cannot form because the ions are more strongly covalently bonded to the chelating molecule than attracted to anions in the brine.

Unfortunately, the current scale inhibitors are ineffective to inhibit formation of halite and other scales formed by monovalent ions. For example, halite crystals are composed of sodium and chloride ions, which are monovalent. Metal ions are generally divalent (e.g., calcium, barium) and chelation has a higher preference for the more highly charged metal ions than the monovalent sodium ions. This leaves the sodium ions free to form halite crystals with the chloride ions in the brine upon cooling or increase in concentration.

In contrast, the polymer matrix particles described herein work by a non-chelating mechanism and are effective for binding either monovalent or divalent ions. Thus, the polymer matrix particles are effective for inhibiting the formation of halite and other scales formed by monovalent ions, in addition to scales formed by divalent ions.

The polymer matrix particles are each comprised of a water-insoluble, porous, crosslinked polymer matrix or support structure. The matrix is an amorphous polymer in which the crosslinks provide a three-dimensional network. The polymer matrix comprises a polymer backbone and ionic functional groups covalently bonded to the backbone.

The polymer backbone of the matrix may comprise any suitable polymer or copolymer. Examples of polymers include, but are not limited to, polyacrylates, polyurethanes, polyesters, polystyrenes, polyamides, polyarylates, poly(phenylene sulfide)s, polysulfones, poly(ether sulfone)s, polyolefins, polyvinyls, poly(vinyl alcohols), polyfluorocarbons, polyethers, polycarbonates, poly(phenylene ether)s, and poly(ether ketone)s.

In certain embodiments, the polymer backbone of the matrix is selected from the group consisting of polyacrylates, polyurethanes, polyesters and polystyrenes.

Examples of polyacrylates include polymethacrylates, poly(alkyl methacrylate)s such as poly(methyl methacrylate)s and poly(ethyl methacrylate)s, and polyacrylonitriles.

Polyurethanes are reaction products of a diisocyanate, a polyol, and, where necessary, a chain extender such as ethylene glycol or ethylenediamine. Representative urethane resins are prepared from a soft segment and a hard segment. The soft segment may include, for example, a polyester diol, a polyether diol, or a polycarbonate diol. The hard segment may include, for example, an isocyanate, a low molecular weight diamine, or a glycol.

Examples of polyesters include aliphatic polyesters such as polycaprolactones and poly(lactic acids; and aromatic polyesters such as poly(ethylene terephthalate)s and polybutylene terephthalate)s.

Examples of polystyrenes include styrenic polymers, copolymers of styrene typically with (meth)acrylic acid, a (meth)acrylic ester, or acrylonitrile, and copolymers including a rubber component, such as high-impact polystyrene resins and acrylonitrile-butadiene-styrene resins.

The matrix of the polymer matrix particles may be crosslinked in any suitable manner. For example, monomers suitable to form crosslinks may be mixed with monomers suitable to form the polymer backbone, and an initiator, and the mixture polymerized using a free radical polymerization process. Other types of polymerization processes may also be used.

Some nonlimiting examples of crosslinking monomers include divinyl benzene, vinylbenzyl chloride, glycidyl methacrylate, ethyleneglycol dimethacrylate, ethyleneglycol diacrylate, butanediol dimethacrylate, butanediol diacrylate, hexanediol diacrylate, pentaerythritol triacrylate, tetraethylene glycol dimethacrylate, trimethylolpropane triacrylate, isophorone diisocyanate, and trimethylolpropane trimethacrylate.

Some nonlimiting examples of free radical initiators include azo compounds such as 2,2'-azobisisobutyronitrile (AIBN) and phenylazotriphenylmethane, peroxides such as benzoyl peroxide and diacetyl peroxide, and ammonium persulfate.

The degree of crosslinking and the porosity of the polymer matrix can be adjusted to optimize its mechanical properties, such as structural rigidity and swelling behavior, and to optimize ion transport into and out of the particle.

The polymer matrix particles have a tunable particle size. The polymer matrix particles may have any suitable shape. In certain embodiments, the particles are regularly shaped, having a shape such as spherical, spheroidal, elliptical, cylindrical or the like. The particles may be referred to as "beads". In other embodiments, the particles are irregularly shaped, having a shape such as angular, amorphous or the like.

The polymer matrix particles have tunable ion affinity characteristics. The polymer backbone is functionalized with carefully chosen ionic functional groups that selectively attract and bind the ions of interest for inhibiting formation of a particular type or types of scale in oil or gas wells. This allows for a much greater degree of specificity for targeting a wide range of ionic actors in scale formation.

When injected into the well, the matrix particles act as an ion sponge, attracting the scale-forming ions and thereby preventing crystallization of the ions from beginning. The functionalized matrix particles are designed to have a selective uptake of the scale-forming ions.

The ionic functional groups of the polymer matrix particles are groups that are ionizable and associated with ions. When the matrix particles are injected into a well, the scale-forming ions inside the well exchange with the ions of the functional groups and are ionically bonded to the functional groups.

Depending on the target scale-forming ion(s), the ionic functional groups may be mono- or divalent cationic groups, mono- or divalent anionic groups, or combinations of different groups. The groups may also be categorized as strongly acidic, weakly acidic, strongly basic or weakly basic.

Some nonlimiting examples of cationic functional groups include sulfonic acid, phosphoric acid, carboxylic acid, phosphonic acid, monosulfate ester, mono- and diphosphate ester groups, hydroxylic groups of phenol, thiol, perfluoro tertiary alcohol groups, and other groups which provide a negative fixed charge in aqueous or mixed water and organic solvent solutions.

Some nonlimiting examples of anionic functional groups include quaternary ammonium groups (also referred to as quaternary amines), primary, secondary and tertiary amino groups (amines), tertiary sulfonium groups, quaternary phosphonium groups, and other groups which provide a positive fixed charge in aqueous or mixed water and organic solvent solutions.

In certain embodiments, the ionic functional groups are capable of selectively attracting and binding the chloride ions and/or the sodium ions commonly present in halite scale. They may also bind other halide ions and/or other alkali metal ions. For example, the functional groups may be monovalent cationic groups capable of selectively binding halide ions such as chloride ions. Alternatively, they may be monovalent anionic groups capable of selectively binding sodium ions. In certain embodiments, the anionic groups are sulfonate groups.

In a particular example, the target ion is chloride, one of the main actors in salt crystal formation in oil and gas wells. In this case, a material such as an acrylic acid monomer that is functionalized with a quaternary ammonium group may be polymerized to prepare the functionalized polymer matrix.

As illustrated in FIG. 1, the matrix particles are injected into a well containing ions that form scaling on pipes. The polymer backbone is covalently functionalized with ionic compounds containing counter ions for the target ion. In order to maintain neutrality, the particle will take up the target ion (chloride is illustrated) to balance out the charge on the functional group attached to the polymer backbone.

The ionic functional groups are covalently bonded to the polymer backbone of the polymer matrix. The functionalization may be achieved by first functionalizing monomers and then polymerizing the monomers to produce the polymer backbone. Alternatively, the functionalization may be achieved by first polymerizing monomers to produce the polymer backbone and then functionalizing the backbone. Methods of functionalization of monomers and of polymers are known in the field of polymer chemistry.

The degree of functionalization of the polymer matrix may be tuned to achieve a desired thermodynamic equilibrium state of the system (the polymer matrix particle and the liquid contacting the particle).

In one embodiment, the present invention relates to a suspension for inhibiting scale formation in oil and gas wells. The suspension comprises the above-described polymer matrix particles suspended in an aqueous medium. The aqueous medium may be water, or a mixture of water and other material(s) useful for enhancing the invention or otherwise benefiting operation of the well.

The invention also relates to a method of inhibiting scale formation. The method comprises injecting the polymer matrix particles into an oil or gas well, so that the particles come into contact with a liquid containing salt scale-forming ions. For example, the liquid may be a brine. The ionic functional groups of the polymer matrix particles contact the liquid and selectively attract and bind the salt scale-forming ions.

The polymer matrix particles may be injected into the well in any suitable manner. For example, they may be injected in the form of an aqueous suspension of particles as described above. Alternatively, the particles may be injected without putting them in a suspension. They may be injected using any suitable equipment.

Further, the polymer matrix particles may be injected at any suitable location so that they come into contact with scale-forming ions in the well. In a production well, this may include injection into the tubing, drill pipe, or casing of the wellbore, or injection into the collection of pipes and valves on top of the wellbore. In certain embodiments, the particles may first be injected into an oil or gas formation, for example through an injection well, before being extracted through a production well.

After the polymer matrix particles have been used for inhibiting scale formation by binding scale-forming ions in the oil or gas well, the particles may be easily separated and removed downstream by filtration or gravimetric means. The separated particles may be regenerated for reuse by eluting a controlled pH buffer through a bed of spent particles to displace the scale-forming ions from the particles.

In an alternative embodiment, the polymer matrix particles are incorporated in a coating that is applied to interior surface(s) of an oil or gas well to inhibit scaling. The coating can have any composition that allows the polymer matrix particles to come into contact with scale-forming ions. For example, the coating may have a continuous phase that is oil-based, such as a vegetable oil, or resin-based. In addition to the polymer matrix particles and the continuous phase, the coating may include other treatment chemicals useful in oil or gas wells, such as corrosion inhibitors.

The polymer matrix particles of the invention provide a number of advantages compared to alternative approaches to inhibiting scale formation in oil and gas wells. Alternative approaches may include desalinating water on site for use as a diluent to reduce salt precipitation, or adding scale inhibitors that work by chelation. The use of the polymer matrix particles allows for less onsite equipment compared to onsite desalination; this technology does not require additional equipment on site. The polymer matrix particles are more effective than chelating inhibitors for inhibiting scaling caused by monovalent ions such as halite. The polymer matrix particles provide cost and performance advantages to the oil and gas industry.

Certain embodiments of the present invention are defined in the Examples herein. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various usages and conditions.

Examples

The usefulness of the present technology to prevent crystallization of halites was demonstrated in the following study. Tetrabutylammonium bromide (TBAB) was compared to alternative potential salt crystallization inhibitors: p-toluene sulfonic acid (PTSA), potassium acetate and a control system with no additive. Each test system was added to a supersaturated solution of sodium chloride and allowed to sit overnight. After 24 hours, the TBAB sample was the only vial that did not show any evidence of salt crystallization. This work is detailed hereinbelow.

Tests to Prevent NaCl Formation

Make a supersaturated NaCl solution and see if additives prevent crystallization of the NaCl.

Test #1: Dissolve 2.5 g potassium acetate ($KC_2H_3O_2$) in 47.5 g DI water. Add 34.55 g NaCl to make the solution supersaturated. Roll mix for 2 hours.

Test #2: Dissolve 50 g NaCl in 125 ml DI water to make a supersaturated solution. Roll mix for 2 hours.

Test #3: Dissolve 2.5 g p-toluene sulfonic acid (PTSA) in 47.5 g DI water. Add 38.55 g NaCl to make the solution supersaturated. Roll mix for 2 hours.

Test #4: Dissolve 2.53 g tetrabutylammonium bromide (TBAB) in 47.5 g DI water. Add 36.74 g NaCl to make the solution supersaturated. Roll mix for 2 hours.

For each of the four test samples, after the roll mixing, use a 0.2 nm syringe filter to filter out NaCl. Allow the samples to sit to follow crashing out.

24 hours later: 10 crystals appeared in the PTSA system (Test #3) and in the saturated NaCl system (Test #2), and 5 crystals appeared in the $KC_2H_3O_2$ system (Test #1). Zero crystals appeared in the TBAB system (Test #4).

About 3 weeks later there was no change in the crystallization compared with 24 hours.

All publications, including patents and non-patent literature, referred to in this specification are expressly incorporated by reference herein. Citation of the any of the documents recited herein is not intended as an admission that any of the foregoing is pertinent prior art. All statements as to the date or representation as to the contents of these documents is based on the information available to the applicant and does not constitute any admission as to the correctness of the dates or contents of these documents.

While the invention has been described with reference to various and preferred embodiments, it should be understood by those skilled in the art that various changes may be made and equivalents may be substituted for elements thereof without departing from the essential scope of the invention. In addition, many modifications may be made to adapt a particular situation or material to the teachings of the invention without departing from the essential scope thereof. Therefore, it is intended that the invention not be limited to the particular embodiment disclosed herein contemplated for carrying out this invention, but that the invention will include all embodiments falling within the scope of the claims.

What is claimed is:

1. A method of inhibiting scale formation in an oil or gas well comprising:
   (a) injecting a suspension of polymer matrix particles into an oil or gas well, so that the polymer matrix particles come into contact with a liquid containing salt scale-forming ions, each polymer matrix particle comprising a water-insoluble, porous, crosslinked polymer matrix, the polymer matrix comprising a polymer backbone and ionic functional groups covalently bonded to the backbone, the ionic functional groups contacting the liquid and selectively attracting and binding the salt scale-forming ions; and then
   (b) separating the polymer matrix particles after they have bound the salt scale forming ions.

2. The method of claim 1 wherein the polymer matrix particles are separated by filtration or gravimetrically.

3. The method of claim 1 further comprising regenerating the polymer matrix particles after they are separated by removing the bound salt scale-forming ions.

4. The method of claim 3 wherein the polymer matrix particles are regenerated for reuse by eluting a controlled pH buffer through a bed of spent particles to displace the scale-forming ions from the particles.

5. The method of claim 3 wherein the polymer matrix particles are regenerated by using a controlled pH buffer to displace the salt scale-forming ions from the particles.

6. The method of claim 1 wherein the liquid containing the salt scale-forming ions is a brine.

7. The method of claim 1 wherein the ionic functional groups comprise quaternary ammonium groups.

8. The method of claim 7 wherein the quaternary ammonium groups comprise tetrabutylammonium.

* * * * *